March 3, 1959
B. H. THURMAN
2,876,242
PROCESS FOR REFINING FATTY OILS
Filed Jan. 14, 1955
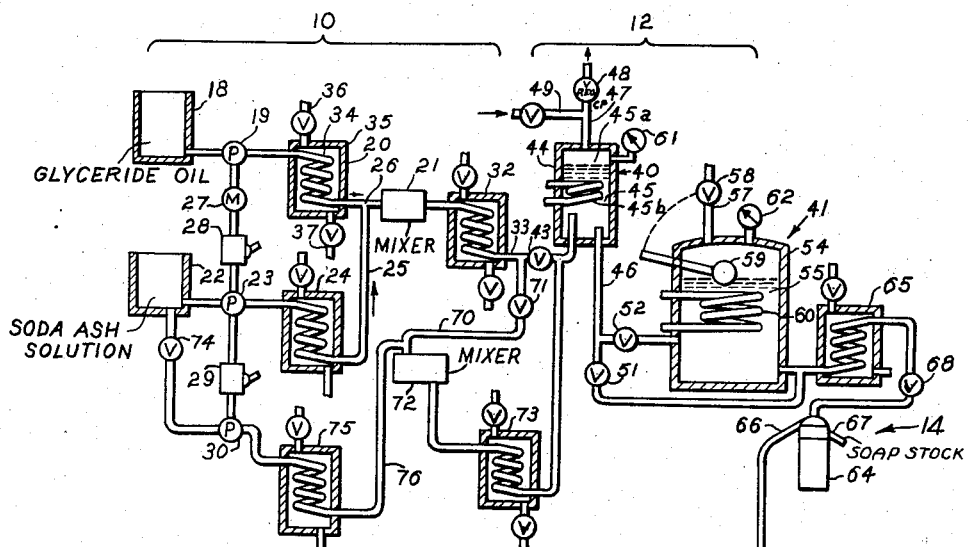
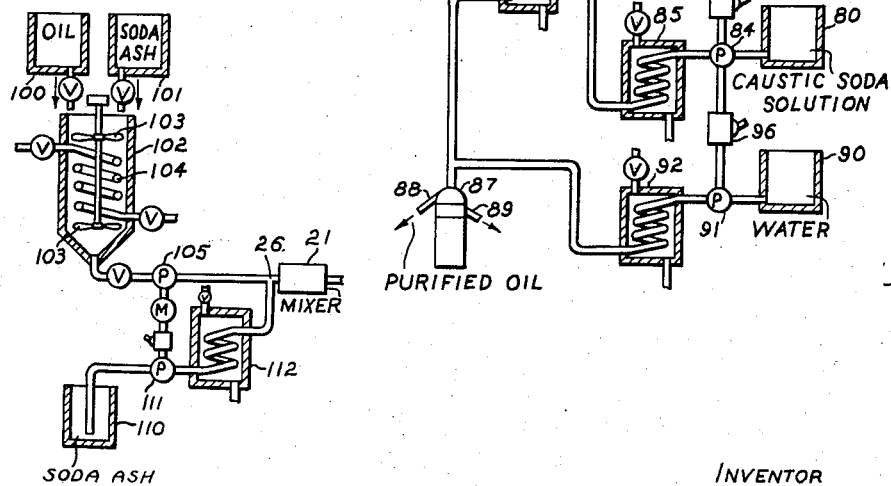
INVENTOR
BENJAMIN H. THURMAN
BY HIS ATTORNEYS
HARRIS, KIECH, FOSTER & HARRIS

2,876,242

PROCESS FOR REFINING FATTY OILS

Benjamin H. Thurman, New York, N. Y., assignor to Benjamin Clayton, Houston, Tex.

Application January 14, 1955, Serial No. 481,930

11 Claims. (Cl. 260—425)

This invention relates to the refining of glyceride oils, particularly animal, vegetable and mineral oils. Generally stated, the invention is concerned with the refining of such oils by use of soda ash and in such manner that carbon dioxide is evolved and removed before the oil-soapstock mixture is separated.

Such glyceride oils contain acidic impurities including and sometimes composed largely of free fatty acids. These must be largely removed in the refining operation to produce a marketable oil. One early refining process mixed caustic soda with the oil to react with the acidic impurities and produce soaps which were separable from the oil. Oil losses were relatively large in batch-type operations, and even the later continuous process produced undesirably high losses due largely to the reaction between the caustic soda and the oil itself or to undesirably high entrainment of oil in the separated soapstock.

More recently, soda ash refining processes have been used on many oils. In all instances, an aqueous solution of soda ash has been mixed with the oil in amounts greatly in excess of that theoretically required to react the acidic impurities. Soda ash is a substantially non-saponifying neutralizing agent but when it reacts with fatty acids or with the reaction products of the two, carbon dioxide is liberated and interferes with both the desired separation and the desired completion of the reaction. To solve this problem, it has heretofore been common to employ either a dehydration-rehydration process or a high-excess process. In the former, an amount of soda ash equal to 5-6 times the amount required to neutralize the oil acidity is employed commercially. The soda ash solution is mixed with the oil and the mixture is sent to a dehydration zone maintained under vacuum to liberate and remove carbon dioxide and water. The dehydrated mixture is then rehydrated and centrifuged. In the high-excess process, the amount of soda ash is sufficient substantially to suppress the formation of carbon dioxide and to effect a good separation. Excesses of 6-8 times the amount required to neutralize are commonly employed, often more. The oil-soapstock mixture is not dehydrated and rehydrated but is sent directly to a centrifuge. Sufficient excesses of soda ash are used to prevent gassing and to insure that the neutralization of the free fatty acids shall proceed to the bicarbonate stage.

In contradistinction to these prior processes, it has now been found that substantially improved results can be obtained by employing soda ash in amounts insufficient to prevent liberation of carbon dioxide and then degasifying the mixture before separation. Usually the amount of soda ash will be less than three times the amount theoretically required to neutralize the acidic impurities and preferably not more than about twice the amount thus theoretically required. Prior to the present invention, such small excesses have been proposed only when separation was effected under substantial pressure and at quite low temperatures in a closed or hermetically sealed centrifuge to avoid liberation of carbon dioxide. Such centrifuges are costly and any low-excesses process employing them is sometimes erratic and fails to give the desired products and economies of the present process.

It is an object of the present invention to provide a novel process and apparatus in which glyceride oils are mixed with an amount of soda ash insufficient to suppress the evolution of carbon dioxide, and in which such carbon dioxide is removed from the oil-soapstock mixture before separating the soapstock from the oil. By doing this it becomes possible to use conventional centrifuges, operating at substantially atmospheric pressure. It is another object to separate the carbon dioxide without substantial dehydration of the oil-soapstock mixture; also to separate the carbon dioxide while the mixture is at superatmospheric pressure. It is a further object of the invention to use, in its usual practice, excesses which are less than three times and preferably no more than twice the amount required theoretically to neutralize the acidic impurities of the oil. Another object is to add the soda ash to the oil in one or two portions.

Refining processes are judged in part by the type of soapstock they produce. Soda ash soapstocks are commonly acidulated with sulfuric acid to produce black grease or acid oil. The more soda ash that is employed in the refining, the greater the amount of sulfuric acid that is required for converting the soapstock to acidulated soapstock. It is an object of the present invention to provide a process and apparatus which will permit substantial savings in the amount of sulfuric acid employed if the soapstock is acidulated.

In the dehydration-rehydration and high-excess soda ash processes, the soapstocks are often so low in total fatty acids as not to be salable. This is particularly true in the refining of oils low in free fatty acids and high or medium in gum content; also in refining degummed oils low in free fatty acids. The low content in total fatty acids is the result of the large excess of soda ash solution which dilutes the soapstocks as compared with the total fatty material present. It is an object of the present invention to provide a novel process and apparatus producing soda ash soapstocks of increased total fatty acid content.

Another important feature of the present invention is that the soapstocks produced by the present process have desirably low moisture content. It is an object of the invention to provide soda ash soapstocks containing less moisture than soapstocks from high-excess soda ash processes. It is a further object of the invention to provide soda ash soapstocks usually containing less than about 30% moisture.

A further and important advantage of the process is that it can produce a soapstock excellently suited as an additive to animal feeds. For example, the low-excess soda ash soapstock resulting from refining a crude soya oil may be used instead of lecithin for feeds. It is an object of the invention to provide a refining process producing a soapstock that can be used as a feed supplement.

The oil separated from the soapstock in the present process is directly usable or, if desired, it can be re-refined with a low refining loss and with the production of good colors. Such re-refining can be effected by mixing a small amount of sodium hydroxide with the separated oil and centrifugally separating the mixture with or without the addition of a diluent, such as water, immediately ahead of or within the centrifuge. It is an object of the invention to provide a process and apparatus for re-refining the oil separated from the soapstock in a low-excess soda ash process. Further objects and advantages will be apparent to those skilled in the art from the following description of exemplary embodiments.

Referring to the drawing:

Fig. 1 is a schematic pipe-line diagram of an apparatus suitable for carrying out a continuous process in accordance with the invention; and Fig. 2 is a similar diagram illustrating a modified apparatus which can be substituted for a portion of the apparatus of Fig. 1 to effect the initial mixing operations.

Referring particularly to Fig. 1, the exemplified apparatus includes, generally described, a proportioning-heating means 10, a degasifying means 12, a separating means 14 and a re-refining means 16.

The oil to be refined may be withdrawn from a tank 18 by a proportioning pump 19 which delivers a stream thereof through a heater 20 to a mixer 21. Similarly, a solution of soda ash may be withdrawn from a tank 22 by a proportioning pump 23 which forces the stream through a heater 24 and through a pipe 25 which may discharge directly into the mixer 21 or, as shown, into a pipe junction 26 to preliminarily mix with the oil just ahead of the mixer. The mixer 21 may be of any suitable type which will thoroughly and intimately mix the soda ash solution with the oil and form an oil-soapstock mixture after reaction between the soda ash and the acidic impurities. While the process may employ mixing intensities commonly used in the continuous refining of vegetable oils, it is often desirable to use a more intimate and relatively intense mixing to insure efficient contact and to achieve efficient neutralization and refining with the low excess of soda ash desirably employed in the process. This excess is under the control of the proportioning pumps and Fig. 1 shows the pumps 19 and 23 driven by a motor 27 connected to one or the other of these pumps through a speed-change device 28. Similarly, the motor 27 may drive, through a speed-change device 29, an auxiliary proportioning pump 30 to be later mentioned.

The oil-soapstock mixture issuing from the mixer 21 is advanced, under the pressure imposed by the pumps 19 and 23, through a heater 32 from whence it is delivered to the degasifying means 12 through a pipe 33. The heaters 20, 24 and 32, as well as similarly-shown heaters to be later mentioned, are each illustrated as including a coil 34 in a housing 35 through which any desired heating medium is circulated by means of pipe connections 36 and 37.

The degasifying means 12 includes, collectively or singly, gas separators 40 and 41 sequentially connected between the proportioning-heating means 10 and the separating means 14. These gas separators collectively or singly provide a first zone in which carbon dioxide is separated from the oil-soapstock mixture and removed from the system. The separating means 14 provides a second zone in which the soapstock is separated from the oil.

The oil-soapstock mixture flowing through the pipe 33 under the control of a valve 43 enters a container 44 of the gas separator 40 at a level several inches beneath the surface of a body of oil-soapstock mixture 45 therein. The discharge is typically at a position about ¼–½ the height of the container 44 measured from its lower wall. A stream of the oil-soapstock mixture from the body 45 is withdrawn, usually continuously, from the lower end of the container 44 through a pipe 46. The upper end of the container 44 is filled with a body of carbon dioxide 45a which blankets the surface of the body 45. Carbon dioxide is continuously evolved and separated from the body 45 of constantly-renewed oil-soapstock mixture in the container 44. If desired, this body may be heated by a heater 45b.

Means is provided for maintaining a substantially constant pressure in the container 44, preferably a pressure which is above atmospheric and above the pressure in the separating means 14 by a predetermined degree. In some instances, this can be accomplished by discharging a continuous stream of the carbon dioxide from the closed container 44 through a restriction such as provided by a pipe 47, permitting this gas to discharge into the atmosphere. It is preferable, however, to dispose a pressure-regulated valve 48 in the pipe 47, this valve controlling the flow of carbon dioxide to maintain the pressure in the container 44 substantially constant. A valve pipe 49 may communicate with the pipe 47 to supply compressed air, carbon dioxide or other gas to the upper interior of the container 44 to build up an initial pressure therein during starting of the apparatus and before the body of carbon dioxide 45a is produced.

By opening a valve 51 and closing a valve 52, the degasified oil-soapstock mixture from the gas separator 40 can be delivered directly to the separating means 14 to by-pass the gas separator 41. However, it is often desirable to close the valve 51 and open the valve 52 to flow this mixture through the gas separator 41 wherein additional carbon dioxide may be liberated and wherein a constant head can be imposed on the mixture to feed it at a uniform rate to the separating means 14. The gas separator 41 includes a closed container 54 in which a body 55 of the oil-soapstock mixture collects. Any carbon dioxide evolved and separated from this body is removed through a pipe 57 under the control of a valve 58. This valve is operatively connected to a float 59 to maintain substantially constant in vertical position the level of the body 55. A heater 60 may be installed in the container 54 to heat or maintain the temperature of the body of mixture therein. The pressures in the containers 44 and 54 are indicated respectively by gauges 61 and 62.

The float-operated valve 58 serves also the desirable function of preventing the surface of the oil-soapstock mixture from rising to the intake of the pipe 57, thus acting as a means for maintaining a body of separated carbon dioxide in the container 54 at all times. It thus prevents filling and overflowing of the chamber and coating of the valve parts with the oil-soapstock mixture. A similar float-operated valve is desirably used with the container 44 if only the gas separator 40 is employed ahead of the separating means 14, such a valve being employed as a substitute for or as a supplement to the pressure-regulated valve 48, the latter being preferred.

The separating means 14 is preferably one or more centrifuges. It is a feature of the present invention that conventional centrifuges can be used which operate at substantially atmospheric pressure. However, these centrifuges can be of the closed or hermetic type, operating at superatmospheric pressures and with the effluent streams of substantially neutral oil and soapstock maintained under pressure after they have discharged from the centrifuge. The degasifying of the invention aids in the soda ash refining using such centrifuges as it irons out pulsations and avoids surging therein, particularly at temperatures of 160° F. or higher at the entrance to the centrifugal separator. However, Fig. 1 shows a conventional centrifuge 64 operating at atmospheric pressure and receiving the degasified soapstock-oil mixture through a heat exchanger 65 which may be optionally used or by-passed. This centrifuge separates the mixture into a stream of substantially neutralized oil, discharging through a pipe 66, and a stream of soapstock, discharging through a pipe 67. A valve 68 is preferably disposed in the line ahead of the centrifuge 64 and with the valves 43 and 51 or 52 can be adjusted to regulate the pressures in the various chambers and lines.

During flow through the coil of the heater 32, the oil-soapstock mixture is maintained in turbulent flow while being heated or maintained at the desired temperature. Such extended time of contact is often quite desirable. Should it be desired further to increase this time of contact or additionally to adjust the temperature of the oil-soapstock mixture before discharge into the degasifying means 12, the valve 43 may be closed, in which event the mixture will flow through a pipe 70, if a valve 71 therein is opened, and thence to a mixer 72 and a heat-exchange device 73 constructed similarly to the heaters previously described, the mixture being re-introduced into the pipe 33 beyond the valve 43.

In some instances, superior results are obtained if the small amount of soda ash solution is introduced in two portions. In this instance a first portion is proportioned by the pump 23 as previously described. The second portion may be withdrawn from the tank 22 through a valve 74, being proportioned by the pump 30 and delivered to a heater 75 which discharges the heated soda ash through a pipe 76 into the mixer 72 or into the pipe 70 immediately ahead of the mixer.

In the refining of certain oils, particularly light-colored oils, such as corn oil and peanut oil, the substantially neutral oil discharged through the pipe 66 from the centrifuge 64 may constitute the final product, being collected in a tank 78 and drawn therefrom through a valved pipe 79. In other instances it may be desired to water wash and vacuum dry the effluent oil to produce the final product. However, it is often desirable to remove residual impurities from such oils; also to better the color of dark-colored oils, such as cottonseed oil. This is accomplished in the re-refining means 16 either with or without a preliminary water wash and water separating step. In this re-refining means, a small amount of caustic soda solution is withdrawn from a tank 80 and mixed with the oil. The oil from the tank 78 may be pumped therefrom by a pump 81 discharging through a heat-exchanger 82 to a mixer 83. Caustic soda solution may be proportioned by a pump 84 and passed through a heat-exchanger 85, optionally used, before delivery to the oil in or near the mixer 83, which may be of any suitable type producing a relatively intense mixing action. The resulting mixture may be passed through a heater 86 and delivered to a centrifuge 87 for separation into a purified oil, discharging through a spout 88, and an impurity-containing heavier or aqueous phase discharging through a spout 89. The purified oil may be then washed with water and vacuum dried.

It is often desirable to add a diluting agent to the mixture during or just prior to centrifugal separation. This diluting agent may be water or a dilute electrolyte, such as a dilute solution of soda ash. It may be withdrawn from a tank 90 by a proportioning pump 91 and delivered through a heater 92 to the inlet of the centrifuge 87 or to the interior thereof. Such a diluting agent facilitates separation. Centrifugal separators permitting the diluting agent to be delivered directly thereinto as a flush are known in the art. The pumps 81, 84 and 91 may be driven by a motor 94, shown as connected to the pumps 84 and 91 through speed-change devices 95 and 96.

In some instances, the apparatus of Fig. 2 can be substituted for corresponding portions of the proportioning-heating means of Fig. 1. Here the desired proportions of oil and soda ash may be discharged from containers 100 and 101 into a kettle 102 where the contents may be agitated, as by paddles 103, and wherein the contents may be heated, as by the circulation of a heating medium through a coil 104. A second kettle may be used to mix a second batch of the oil and soda ash during continuous discharge of the first batch from the kettle 102, thus permitting the degasifying and separation means to operate continuously from the effluent of the two kettles. As shown, the resulting mixture is withdrawn by a proportioning pump 105 and delivered to the aforesaid mixer 21. From here the oil-soapstock mixture may flow through the later equipment described with reference to Fig. 1.

If a portion of the soda ash solution is to be separately added, this proportion may be withdrawn from a container 110 by a proportioning pump 111, being delivered through a heater 112 to the mixer 21 or to the junction 26 immediately ahead thereof.

In carrying out the process of the invention, the soda ash solution mixed with the oil may have a concentration ranging from about 10° Bé. up to saturation, preferably about 20° Bé. or higher. In the event high concentrations are desired, the solution may be preheated up to about 220° F. to dissolve a larger amount of soda ash.

The amount of soda ash employed should be sufficient to refine the oil but insufficient to prevent evolution of carbon dioxide. The degasification of the invention is of value in all refining processes in which carbon dioxide forms, and in which the oil-soapstock mixture is not dehydrated and rehydrated before separation. Thus it may be used to advantage in non-dehydration processes employing excesses of soda ash several times those necessary theoretically to react the acidic impurities or free fatty acids. However, in accordance with a preferred practice, the amount of soda ash employed in the refining should be minimized, using only sufficient to precipitate and insolubilize the soapstock and hydrate it sufficiently to be separable by centrifugal methods. It is usually desirable that the amount of soda ash be sufficient to produce a refined oil neutralized to the point of containing not more than about 0.1% of residual free fatty acids.

In the low-excess process, if the soda ash solution is added in two portions, the first portion, proportioned by the pump 23 of Fig. 1 or added directly to the kettle 102 of Fig. 2, should be not more than that amount which would be required theoretically to neutralize the acidic impurities of the oil and should desirably be mixed with the oil at room temperatures, e. g. about 70–80° F. The amount of the second portion, added through the pump 30 of Fig. 1 or the pump 111 of Fig. 2, will represent the balance of the low excess. This second portion is desirably added at a higher temperature, e. g. 160–220° F. If the initial portion of soda ash is added and mixed at a temperature not higher than about 100° F. there will be no significant evolution of carbon dioxide when the mixture is heated to 160° F. or above preparatory to the addition of the second portion. In many instances it is found that more free fatty acids and gums can be removed if the soda ash is added in two portions as compared with the same amount added in one portion, the processing time being the same in the two instances.

The present process operates best at superatmospheric temperatures whether the soda ash is added in one or two portions. The temperatures at the time of separation in the centrifuge 64 are desirably in the neighborhood of 190–220° F., usually about 180–210° F. The heater 65 may be used to supply some of this heat or merely to maintain the temperature of the oil-soapstock mixture fed therethrough from the gas separators 40 or 41. The temperature in these separators is substantially the same as the temperature of the oil-soapstock mixture fed thereto, this temperature ordinarily being about 160–220° F., albeit not above the boiling point of water at the pressures existing in the gas separators 40 or 41, as it is not desired to dehydrate the oil-soapstock mixture by removing any substantial amount of water therefrom. This amount of heat can be supplied almost entirely by the heater 32, sometimes supplemented by the heater 73 or by the heating coils 45b or 60. On the other hand, a portion or all of the heat may be supplied from the heaters 20 and 24 and from the heater 75, if used. A desirable procedure is to supply some of the heat by such heaters and to supply additional heat after mixing the soda ash solution and the oil.

In Fig. 1, the pumps 19, 23 and 30 operate against friction-induced pressures created by stream flow through the several coils, mixers and valves and against the pressure developed by the carbon dioxide in the containers 40 and 41. These pumps should preferably supply sufficient pressure to force the streams through the apparatus with successive pressure drops until separation is effected within the centrifuge 64. As between friction-induced pressure and pressure developed by the carbon dioxide, the former usually predominates in magnitude. For example, if the pressure developed by the pumps 19 and 23 is about 100 p. s. i. and if the friction drop in the heaters and other equipment is 50 p. s. i., the pressure in the container from this source will be 50 p. s. i. The pressure from the carbon dioxide at 200° F. would be only about 4 p. s. i. Positive flow of materials under pump pressure into the containers 44 and 54 compresses the carbon dioxide therein and thus controls the gas valves thereof. The gas bodies in these containers smooth out pressure pulsations and aid in maintaining a constant pressure and flow of the material delivered to the separating means 14.

The pressure in the gas separator 40 is preferably superatmospheric, the discharge of carbon dioxide being controlled or restricted to create sufficient pressure to advance the oil-soapstock mixture to the centrifuge 64. Pressures in the container 44 are preferably 5–20 p. s. i., usually about 5–10 p. s. i. although they may be as high as 50 p. s. i. or higher under some circumstances. The valve 43 may be used as a throttle valve, creating a pressure drop as the mixture flows into the container 44. This pressure drop may be in the neighborhood of 3–10 p. s. i., but is not critical as the process will usually operate satisfactorily if there is substantially no restriction in the pipe 33. Carbon dioxide may be present in the oil-soapstock mixture before discharge in the container 44, although its evolution will be accelerated by a pressure drop upon discharge thereinto.

The body of carbon dioxide 45a blankets the surface of the body 45 of the mixture and tends to prevent foaming. However, the body 45 may be composed in part of foam, but exclusion of the atmosphere from the container 44 prevents stabilization of this foam.

The gas separator 41 may be used to separate additional quantities of carbon dioxide, as well as to maintain a constant pressure head on the mixture delivered to the centrifuge 64. In some instances it is desirable that the pressure within the container 54 shall be 5–10 p. s. i. lower than the pressure in the container 44. The valve 52 may be pinched down to accomplish this, in which event the pressures in the container 44 may be correspondingly higher than those previously mentioned as preferred. The removal of the carbon dioxide in the gas separators 40 and 41 helps drive the neutralization to completion and removes gases which, if liberated in the centrifuge, would give erratic or totally unsatisfactory separation.

In the re-refining means 16, the amount of caustic soda solution and its concentration will depend largely upon the type and characteristics of the substantially neutral oil in the tank 78. Generally speaking, the concentration of this solution will range between 10° and 50° Bé. and the amount of such solution will usually range between approximately 0.5% and 4%, the quantity most generally used being in the neighborhood of 2% based on the weight of the oil. With highly-colored cottonseed oil, concentrations of about 20–50° Bé. are desirable, usually about 24–40° Bé., together with the use of water from the tank 90 supplied as a flush to the interior or inlet of the centrifuge 87. Crude soya oil can sometimes be re-refined without such a flush if low-concentration solutions of caustic soda are used, e. g., about 6–10° Bé., but it is usually desirable to use higher concentrations with a water flush.

The temperature of mixing in the mixer 83 is about 70–140° F., a range of about 70–100° F. being most commonly employed except when removing certain types of impurities when temperatures as high as 130–140° F. are better. These temperatures in the mixer 83 may be increased or decreased in the heater 86. The temperature of separation is usually about 120–180° F., preferably about 120–160° F., although with some oils separation temperatures as low as 100° F. can be employed. Water is the preferred diluting agent, the amount ordinarily used being between about 2.5 and 10 times the weight of caustic soda solution used. With higher concentrations, it is usually desirable to reduce the concentration in the centrifuge 87 to at least 8° Bé., although concentrations up to 10°–12° Bé. will be found operable. The temperature of the diluting agent should desirably be as high as the mixture entering the centrifuge and may be higher, such temperatures being produced by the heater 92.

I claim as my invention:

1. A process for refining glyceride oils containing acidic impurities including free fatty acids, which process includes the steps of: mixing soda ash with said oil under conditions producing an oil-soapstock mixture containing carbon dioxide and water, the amount of soda ash used being no more than a small excess over that required theoretically to neutralize said acidic impurities, said excess being insufficient to prevent evolution of carbon dioxide in the mixture; removing the carbon dioxide from such oil-soapstock mixture in the absence of substantial dehydration of the mixture; and then subjecting the resulting mixture to a separating action to separate the soapstock from the oil.

2. A process as defined in claim 1 in which said carbon dioxide is removed by discharging a stream of said oil-soapstock mixture into a zone closed from the atmosphere and withdrawing carbon dioxide but substantially no water vapor from the upper end of said zone at such rate as to maintain therein a body of oil-soapstock mixture of substantially constant volume.

3. A process as defined in claim 2 in which said stream of said oil-soapstock mixture is introduced into said zone at a position submerged in said body of oil-soapstock mixture therein.

4. A process as defined in claim 2 including the step of withdrawing a continuous stream of said resulting mixture from said closed zone, and including the step of controlling the withdrawal of carbon dioxide from the upper end of said zone to keep the level of said body of oil-soapstock mixture substantially constant in position.

5. A process as defined in claim 1 in which the carbon dioxide is removed from the oil-soapstock mixture by flowing the mixture successively through two gas separation chambers, the resulting mixture being then subjected to a centrifugal separating action to effect said separation of soapstock from the oil, each gas separation chamber containing a liquid body and a superimposed gas body, and including the steps of withdrawing gas from the gas body in one of said chambers at a rate to maintain substantially a constant pressure in such chamber, and withdrawing gas from the gas body in the other of said chambers at a rate to maintain the liquid body therein of substantially constant volume.

6. A process as defined in claim 1 in which the oil-soapstock mixture is maintained under superatmospheric pressure during said removal of said carbon dioxide.

7. A process as defined in claim 1 in which said carbon dioxide is removed from said oil-soapstock mixture by delivering a stream of such mixture to a chamber containing a liquid body with a superimposed body of gas comprising carbon dioxide, removing from said liquid body the mixture to be separated and withdrawing gas from said body thereof in such manner as to maintain the surface of said liquid body below a predetermined level.

8. A process as defined in claim 7 including the step of withdrawing the gas and the mixture from the respective bodies thereof at such rates as to maintain a superatmospheric pressure in said chamber.

9. A process for refining glyceride oils containing acidic impurities including free fatty acids, which process includes: mixing soda ash with said oil to produce an oil-soapstock mixture, the amount of soda ash being insufficient to suppress the evolution of carbon dioxide, such amount being less than twice the amount theoretically required to neutralize said acidic impurties; advancing the oil-soapstock mixture through a first zone and into a second zone; removing the evolved carbon dioxide from the oil-soapstock mixture in said first zone in the absence of substantial dehydration of the mixture; and then separating the soapstock from the oil in said second zone.

10. A process as defined in claim 9 in which the pressure in said first zone is higher than the pressure in said second zone in which separation of the oil and soapstock takes place.

11. A process for refining glyceride oils containing acidic impurities including free fatty acids, which process includes the steps of: mixing soda ash with said oil under conditions producing an oil-soapstock mixture containing carbon dioxide and water, the amount of soda ash mixed with the oil being less than about three times the amount thereof theoretically required to neutralize said acidic impurities; removing the carbon dioxide from such oil-soapstock mixture in the absence of substantial dehydration of the mixture by delivering a stream of the oil-soapstock mixture to a chamber containing a liquid body with a superimposed body of gas comprising carbon dioxide, and withdrawing gas and liquid from the respective bodies thereof in such manner as to maintain the surface of said liquid body below a predetermined level, the withdrawn liquid comprising a mixture of soapstock and oil; and subjecting the withdrawn liquid to a separating action to separate the soapstock from the oil.

References Cited in the file of this patent

UNITED STATES PATENTS

| | | |
|---|---|---|
| 2,131,905 | Strezynski et al. | Oct. 4, 1938 |
| 2,150,797 | Clayton et al. | Mar. 14, 1939 |
| 2,392,973 | Clayton | Jan. 15, 1946 |
| 2,607,788 | Clayton | Aug. 19, 1952 |